United States Patent

[11] 3,566,966

| [72] | Inventor | Eugene D. Glass<br>Tulsa, Okla. |
|---|---|---|
| [21] | Appl. No. | 762,988 |
| [22] | Filed | Sept. 26, 1968 |
| [45] | Patented | Mar. 2, 1971 |
| [73] | Assignee | Cities Service Oil Company<br>Tulsa, Okla. |

[54] GAS PRODUCTION BY NUCLEAR STIMULATION
6 Claims, No Drawings

[52] U.S. Cl. .................................................. 166/247,
166/305
[51] Int. Cl. ................................................... E21b 43/26
[50] Field of Search ....................................... 166/247,
305D; 61/.5

[56] References Cited
UNITED STATES PATENTS
3,292,693  12/1966  Hill ............................. 166/305(D)

OTHER REFERENCES

Project Gasbuggy— Has it Been Misjudged? In World Oil, 165(6), Nov. 1967, pp.13— 16. (Copy in 166-247) Ward, D. C., et al.

Project Gasbuggy— A Nuclear Fracturing Experiment. In J. Petroleum Technology, 18(2), Feb. 1966, pp. 139— 145. (Copy in 166-247)

*Primary Examiner*—Charles E. O'Connell
*Assistant Examiner*—Ian A. Calvert
*Attorney*—J. Richard Geaman ABSTRACT: Gases in the chimney of broken reservoir rock formed by the detonation of a nuclear device are withdrawn as quickly as possible following the detonation. The gases are pumped to another geologic horizon for disposal until the level of long half-life, gaseous contamination drops below the tolerable limits for such contamination. By withdrawing the contaminated gases from the chimney quickly, the pressure in the chimney at the time of withdrawal will be near that immediately after the nuclear explosion and will not have built up to values near the equilibrium pressure of the reservoir. The amount of reservoir gas contaminated with said radioactive contamination and the consequent disposal problem are thereby minimized. Decontaminating processes at the surface to reduce said long half-life, gaseous contamination may be avoided. When the level of said long half-life, gaseous radioactive contamination falls below the tolerable limits for such contamination, the gases thereafter withdrawn from said chimney may be recovered as product gas suitable for processing and use.

GAS PRODUCTION BY NUCLEAR STIMULATION

BACKGROUND OF THE INVENTION

1. Field of the Invention

This invention relates to the recovery of gas from subterranean reservoirs. More particularly, it relates to the recovery of gases following the stimulation of a subterranean gas reservoir by the detonation of a nuclear device.

2. Description of the Prior Art

The detonation of nuclear devices for the stimulation of low-permeability natural gas reservoirs is known in the art. An emplacement hole is drilled to accommodate the nuclear device. Upon detonation, the energy of the device is generated in a fraction of a microsecond causing the vaporizing, melting and crushing of the reservoir rock. A cavity is thus created. This cavity is filled with vaporized and melted rock and debris. The melted rock will tend to collect in a pool at the bottom of the spherical cavity. Most of the radioactive products will be trapped in this pool as it solidifies. The collapse of the roof of this cavity will result in the development of an upwardly extending cylindrical chimney of broken reservoir rock.

The permeability of the reservoir rock surrounding the chimney thus formed will be increased by the nuclear explosion. The force of the explosion will cause fracturing of the rock beyond the chimney area resulting in significant alteration of the permeability of the rock, thereby accomplishing the desired stimulation of the reservoir. Gas production can be accomplished, as a result, by drilling into the chimney.

Regardless of the type of nuclear device employed, the detonation will result in the production of radioactive isotopes. The majority of the solid radioactive contaminants produced, such as strontium 89 and cesium 137, are trapped in the melt at the bottom of the cavity. Any remaining particles of solid contaminants, as well as any liquid contaminants, can be removed from the gases withdrawn from the reservoir by filtration.

In the detonation of an all-fission device or a fission section, xenon 133, iodine 131 and krypton 85 are produced as gaseous contaminants. When a fusion section is exploded, radioactive tritium is also produced. Xenon 133 and iodine 131 are short-lived isotopes having relatively short half-lives. Xenon 133, for example, has a 5.3-day half-life, while iodine 131 has an 8-day half-life. After a few months, therefore, these isotopes will have decayed back to tolerable levels.

Krypton 85 and tritium, however, have relatively long half-lives. Krypton 85 has a 10.3-year half-life. Tritium has a half-life of 12 years. These long half-life, gaseous radioisotopes, which cannot be filtered out, result in a long term contamination problem with respect to gases produced from the chimney following nuclear stimulation of the gas reservoir.

Various government agencies, such as the Federal Radiation Council and the Atomic Energy Commission, have set standards establishing the maximum tolerable (or permissible) concentration of radioactive materials to which industrial workers and the general public may be exposed. These standards, of course, are intended to assure the safety of the public and of those exposed to such radioactive materials.

As a result of the decay process, the concentration of the short half-life contaminants becomes negligible after several months. The amount of krypton 85 and tritium, after some reasonable period such as 9 months, may still be several hundred times the maximum tolerable limits for these radioisotopes. The necessary reduction of the contamination caused by these long half-life, gaseous radioisotopes presents a serious problem that must be overcome before gas production by nuclear stimulation can be successfully employed.

It is an object of this invention, therefore, to provide an improved process for the recovery of gas from low-permeability natural gas reservoirs.

It is another object of this invention to provide an improved process for recovering the gas from a subterranean reservoir following nuclear stimulation.

It is another object of the invention to provide a process for recovering gases from a subterranean reservoir following nuclear stimulation in which the problems of long half-life, gaseous contamination are minimized.

It is a further object of the present invention to provide a process in which the effects of krypton 85 and tritium contamination following nuclear stimulation of a gas reservoir are minimized.

It is a further object of this invention to provide a process by means of which the disposal of radioactive contaminants of a gas stream recovered after nuclear stimulation of the gas reservoir is facilitated.

With these and other objects in mind, the present invention is hereafter set forth and the novel features thereof pointed out in the appended claims.

SUMMARY OF THE INVENTION

The objects of the invention are accomplished by a process in which gas is withdrawn from the chimney formed by nuclear stimulation of the gas reservoir as quickly as possible following the nuclear detonation. The gas withdrawal is thus begun before the pressure in the chimney has increased significantly from the pressure shortly after detonation toward the higher reservoir equilibrium pressure. The gas first removed will contain a high concentration of the long half-life gaseous contaminants in the chimney, i.e. krypton 85 and tritium. This gas is pumped or flowed to another geologic horizon or a remote portion of the gas reservoir for disposal. Gas is continually removed and disposed of in this fashion until the level of such contamination falls below the maximum tolerable level for each of said contaminants present in the gas removed from the chimney.

Upon reduction of the concentration of long half-life, gaseous radioactive contaminants in the chimney, product gas from the chimney may be recovered and processed as required in accordance with known technology prior to delivery to pipelines for ultimate disposal.

DETAILED DESCRIPTION OF THE INVENTION

As indicated above, the present invention calls for the withdrawal of contaminated gases from the chimney as soon as possible following the nuclear detonation. For this purpose, a production well may be conveniently drilled into the upper portion of the chimney area. Alternately, the emplacement hole may be opened in order to permit withdrawal of gases from the chimney. In keeping with the inventive concept herein provided, the access from the surface to the chimney should be achieved as soon as possible after security provisions permit access to the detonation area.

After the production well has been opened, withdrawal of gas mixed with the radioactive contaminants formed as a result of the detonation of the nuclear device should be commenced as soon as practical. The pressure in the chimney after the nuclear detonation may be on the order of 100 p.s.i. While the chimney pressure when gas withdrawal is commenced is not critical, it is preferred, for purposes of this invention, that the gases containing long half-life, gaseous contaminants be withdrawn at a chimney pressure as close as possible to the initial low pressure following detonation and before the chimney pressure has had an opportunity to increase to a value approaching the ultimate equilibrium pressure. Within a month, the pressure may be two-thirds of this value.

As gas withdrawal from the chimney is begun, the gases will be contaminated with prohibitive quantities of long half-life, gaseous contaminants as well as by short half-life gaseous contaminants and by small amounts of liquid and solid contaminants that can be removed without particular difficulty. The quantity of gas mixed with the contaminants will be less, however, than the quantity of gas that would be so contaminated if the chimney pressure were allowed to build up toward reservoir equilibrium pressure prior to withdrawal of the contaminated gases. Not only are smaller quantities of gas thus contaminated, but the problems of disposal of said gases are correspondingly reduced.

Quite obviously, therefore, the beneficial results of this invention are enhanced by the withdrawal of the contaminated gases at the lowest possible chimney pressure. While the initial withdrawal chimney pressure is not critical as indicated above, it would be hoped that the increase in pressure following the detonation and to the time in which the long half-life contaminants have been removed from the chimney can be kept as low as possible.

The withdrawn gases may be analyzed at the surface by conventional means to determine the amount of krypton 85 and radioactive tritium contamination contained therein. This amount will decrease, of course, as the contaminants are swept from the chimney. The gases containing excessive levels of long half-life contamination are pumped to another geologic horizon or to a remote region of the gas reservoir and stored underground for disposal and ultimate decay of its long half-life contamination. Thus, no decontamination procedure need be carried out at the surface. The excessively contaminated gas is quickly and safely removed, avoiding the hazard of radioactive contamination to the general public. In disposing of the contaminated gas in this manner, the gases are pumped or flowed at a pressure exceeding the formation pressure in the subterranean area in which they are to be stored.

When the level of long half-life, gaseous contamination, i.e. krypton 85 and radioactive tritium, has dropped below the maximum tolerable level of contamination for these contaminants, the gas withdrawn from the chimney may thereafter be recovered as product gas. This gas may still require processing, such as filtration, to remove liquid and solid contaminants and the like, prior to delivery to a pipeline for ultimate disposition. In this regard, however, the gases withdrawn to underground disposal will likely have drawn from the chimney area much of the short half-life, gaseous contaminants and liquid and solid contaminants mixed with the gases after the nuclear explosion. It is also within the scope of this invention to temporarily suspend gas recovery operations following withdrawal of the long half-life, gaseous contaminants in order to allow additional time for decay of any remaining short half-life, gaseous contaminants prior to recovery of product gas at the surface.

The present invention, therefore, provides a highly significant, practical solution to the serious problem of radioactive contamination of a nuclear-stimulated subterranean gas reservoir. The long half-life, gaseous radioisotopes may be quickly and safely disposed of with minimum contamination of gas in the reservoir. Decontaminating processes for removal of these long half-life contaminants at the surface is avoided, and the disposal of the contaminated gases is facilitated by the minimum quantity of reservoir gas contaminated. The recovery of product gas from a nuclear stimulated reservoir without exceeding the tolerable limits of long half-life contamination is thereby enhanced.

The invention has been described herein with respect to particular embodiments and aspects thereof. It will be appreciated by those skilled in the art that various changes and modifications can be made, however, without departing from the scope of the appended claims.

I claim:

1. A method for recovering product gas from a subterranean gas reservoir following stimulation of said reservoir by the detonation of a nuclear device therein without exceeding the tolerable limits of radioactive contamination in said product gas comprising:
   a. drilling a producing well into the chimney of broken reservoir rock formed as a result of the nuclear detonation;
   b. withdrawing gases containing said radioactive contamination from said chimney through the producing well while the chimney pressure is not appreciably higher than the initial pressure in the chimney shortly following the detonation of the nuclear device and before said chimney pressure approaches the equilibrium reservoir pressure;
   c. pumping said contaminated gases thus removed from the chimney into a geologic area remote from said chimney and its surrounding gas reservoir area until the level of long half-life, gaseous contamination in said removed gases drops below the maximum tolerable level for each of the long half-life radioactive contaminants in said gases; and
   d. thereafter recovering product gases from said chimney through the producing well, whereby the long half-life, gaseous contaminants resulting from the detonation of the nuclear device may be removed from the chimney of broken reservoir rock quickly, the amount of reservoir gas exposed to prohibitive levels of contamination may be minimized, and the problems of decontaminating the gases removed from said chimney may be avoided while the recovery of product gas having an acceptable level of long half-life, gaseous radioactive contamination may be facilitated.

2. The method of claim 1 in which the nuclear detonation comprises the explosion of a fission device and the long half-life, gaseous contamination present in the chimney gases immediately following said detonation comprises krypton 85.

3. The method of claim 1 in which the nuclear detonation comprises the explosion of a fusion section and the long half-life, gaseous contamination present in the chimney gases immediately following said detonation comprises krypton 85 and radioactive tritium.

4. The method of claim 1 in which said drilling of a producing well into the chimney comprises the opening of the emplacement hole used for placement of the nuclear device in said gas reservoir.

5. The method of claim 1 in which said drilling of a producing well and the withdrawing of gases containing an excessive level of long half-life, gaseous radioactive contamination is commenced shortly after said detonation of the nuclear device.

6. The method of claim 1 in which the contaminated gases removed from said chimney are pumped into a remote area of said reservoir formation.